US008392926B2

United States Patent
Kimbrel et al.

(10) Patent No.: US 8,392,926 B2
(45) Date of Patent: Mar. 5, 2013

(54) SCHEDULING HETEROGENEOUS PARTITIONED RESOURCES WITH SHARING CONSTRAINTS

(75) Inventors: Tracy J. Kimbrel, Cortlandt Manor, NY (US); Tarun Kumar, Mohegan Lake, NY (US); Kevin D. McKenzie, Poughkeepsie, NY (US); Richard D. Prewitt, Jr., Poughkeepsie, NY (US); Maxim Sviridenko, New York, NY (US); Debra Tomkowid, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 12/755,089

(22) Filed: Apr. 6, 2010

(65) Prior Publication Data

US 2011/0246994 A1    Oct. 6, 2011

(51) Int. Cl.
  *G06F 9/46* (2006.01)
(52) U.S. Cl. .................................................. 718/103
(58) Field of Classification Search .................. None
  See application file for complete search history.

(56) References Cited

U.S. PATENT DOCUMENTS

| 7,793,294 | B2 * | 9/2010 | Haeri | 718/102 |
| 7,844,973 | B1 * | 11/2010 | Dice | 718/108 |
| 8,000,946 | B2 * | 8/2011 | Haas et al. | 703/6 |
| 2009/0031312 | A1 * | 1/2009 | Mausolf et al. | 718/102 |

OTHER PUBLICATIONS

S. Petrovic and E. Burke entitled "University Timetabling" founding above-incorporated in Handbook of scheduling. Algorithms, models, and Performance Analysis, edited by Joseph Y.-T. Leung. Chapman & Hall/CRC Computer and Information Science Series. Chapman & Hall/CRC, Boca Raton, FL, 2004, chap. 45, pp. 45-1-45-34.

* cited by examiner

*Primary Examiner* — Emerson Puente
*Assistant Examiner* — Gregory Kessler
(74) *Attorney, Agent, or Firm* — Scully, Scott, Murphy & Presser, P.C.; Daniel P. Morris, Esq.

(57) ABSTRACT

A system and method that provides an automated solution to obtaining quality scheduling for users of computing resources. The system, implemented in an enterprise software test center, collects information from test-shop personnel about test machine features and availability, test jobs, and tester preferences and constraints. The system reformulates this testing information as a system of constraints. An optimizing scheduling engine computes efficient schedules whereby all the jobs are feasibly scheduled while satisfying the users' time preferences to the greatest extent possible. The method and system achieves fairness: if all preferences can not be meet, it is attempted to evenly distribute violations of preferences across the users. The test scheduling is generated according to a first application of a greedy algorithm that finds an initial feasible assignment of jobs. The second is a local search algorithm that improves the initial greedy solution.

22 Claims, 11 Drawing Sheets

| PRIORITY 302 | OBJECTIVE 305 | DIRECTION 310 | CASE 1 314 | CASE 2 316 |
|---|---|---|---|---|
| 1 | NUMBER OF PRIORITY JOBS SCHEDULED | LARGER IS BETTER | 10 | 10 |
| 2 | NUMBER OF NON-PRIORITY JOBS SCHEDULED | LARGER IS BETTER | 3 | 3 |
| 3 | MAXIMUM NUMBER OF NEGATIVE-PREFERENCE SLOTS ASSIGNED TO ANY TESTER | SMALLER IS BETTER | 5 | 5 |
| 4 | NUMBER OF TESTERS WITH MAXIMAL NUMBER OF BAD PREFERENCES | SMALLER IS BETTER | 4 | 4 |
| 5 | TOTAL NUMBER OF NEGATIVE-PREFERENCE ASSIGNMENTS | SMALLER IS BETTER 320 | 2 | 3 |
| 6 | MINIMUM NUMBER OF PREFERRED SLOTS ASSIGNED TO ANY TESTER THAT DOES NOT GET ALL JOBS ASSIGNED TO PREFERRED SLOTS | LARGER IS BETTER | 1 | 1 |
| 7 | NUMBER OF TESTERS WITH MINIMAL NUMBER OF PREFERRED TIME SLOTS | SMALLER IS BETTER | 4 | 10 |
| 8 | TOTAL NUMBER OF PREFERRED ASSIGNMENTS | LARGER IS BETTER | 10 | 2 |
| COMPARISON RESULT | COMPARE OBJECTIVE ACCORDING TO THE PRIORITY ORDER | FOLLOW THE DIRECTION | BETTER SINCE OBJECTIVE 5 HAS LOWER VALUE THAN THE CASE 2 SCENARIO | |

| PRIORITY | OBJECTIVE | DIRECTION | GREEDY ALGORITHM | LOCAL SEARCH |
|---|---|---|---|---|
| 1 | NUMBER OF PRIORITY JOBS SCHEDULED | LARGER IS BETTER | 0 | 0 |
| 2 | NUMBER OF NON-PRIORITY JOBS SCHEDULED | LARGER IS BETTER | 0 | 0 |
| 3 | MAXIMUM NUMBER OF NEGATIVE-PREFERENCE SLOTS ASSIGNED TO ANY TESTER | SMALLER IS BETTER | 1 | 0 |
| 4 | NUMBER OF TESTERS WITH MAXIMAL NUMBER OF BAD PREFERENCES | SMALLER IS BETTER | - | - |
| 5 | TOTAL NUMBER OF NEGATIVE-PREFERENCE ASSIGNMENTS | SMALLER IS BETTER | - | - |
| 6 | MINIMUM NUMBER OF PREFERRED SLOTS ASSIGNED TO ANY TESTER THAT DOES NOT GET ALL JOBS ASSIGNED TO PREFERRED SLOTS | LARGER IS BETTER | - | - |
| 7 | NUMBER OF TESTERS WITH MINIMAL NUMBER OF PREFERRED TIME SLOTS | SMALLER IS BETTER | - | - |
| 8 | TOTAL NUMBER OF PREFERRED ASSIGNMENTS | LARGER IS BETTER | - | - |
| COMPARISON RESULT | COMPARE OBJECTIVE ACCORDING TO THE PRIORITY ORDER | FOLLOW THE DIRECTION | | BETTER SINCE OBJECTIVE 3 HAS NO NEGATIVE PREFERENCE |

FIG. 6

WEEK #1: MON JAN 04, 2010 - SUN JAN 10, 2010

| DATE | SHIFT | N68 | SYSPLEX / MACHINES | | |
| --- | --- | --- | --- | --- | --- |
| | | | PLEX 1 | PLEX 2 | PLEX 3 |
| MON JAN 4 2010 | 1 | | SPECIAL REQUEST: JOHN DOE NON DISRUPTIVE MONITOR R12 TESTER: JOHN DOE | RESERVED: USS TEAM | ACTIVITY: CAROL-SOLO-1,3; LEAD: SUE BAKER; ASSIGNED TESTER: SUE BAKER |
| | 2 | | ACTIVITY: SMITH-SOLO-1,3; LEAD: SALLY SMITH | RESERVED: USS TEAM | ACTIVITY: TOSCH-SOLO-3; LEAD: BILL MILLER |
| | 3 | | ACTIVITY: FAVELL-SOLO-1; LEAD: BOB GREEN; ASSIGNED TESTER: BOB GREEN | RESERVED: USS TEAM | ACTIVITY: BROWN-SOLO-1,3; LEAD: TOM BROWN; ASSIGNED TESTER: TOM BROWN |
| TUES JAN 5 2010 | 1 | ACTIVITY: JONES-SOLO-N68; LEAD: JANE JONES; ASSIGNED TESTER: JANE JONES | ACTIVITY: SMITH-HANIF-SOLO-1; LEAD: JIM SMITH; ASSIGNED TESTER: JIM SMITH | RESERVED: USS TEAM | ACTIVITY: JOHNSON-SOLO-1,3; LEAD: JOE JOHNSON; ASSIGNED TESTER: JOE JOHNSON |
| | 2 | | ACTIVITY: THOMPSON-SOLO-1,3; LEAD: JOHN DOE; ASSIGNED TESTER: JOHN DOE | RESERVED: USS TEAM | ACTIVITY: SMITH-SOLO-1,3 LEAD: SALLY SMITH |
| | 3 | | | RESERVED: USS TEAM | ACTIVITY: WHITE-SOLO-1,3; LEAD: ANN WHITE; ASSIGNED TESTER: ANN WHITE |

FIG. 7A

| | | | | |
|---|---|---|---|---|
| WED JAN 6 2010 | 1 | | ACTIVITY: WHITE-SHARED-1; LEAD: JILL WHITE ACTIVITY: DOE-SHARE-1; LEAD: JOHN DOE | RESERVED: USS TEAM | ACTIVITY: JONES-SOLO-1,3; LEAD: JANE JONES |
| | 2 | | ACTIVITY: SMITH-JONES-SOLO-1; LEAD: JIM SMITH; ASSIGNED TESTER: JIM SMITH | RESERVED: USS TEAM | ACTIVITY: JONES-SOLO-1,3; LEAD: JANE JONES; ASSIGNED TESTER: JANE JONES |
| | 3 | | | RESERVED: USS TEAM | ACTIVITY: JOHNSON-SOLO-1,3; LEAD: JOE JOHNSON; ASSIGNED TESTER: JOE JOHNSON |
| THU JAN 7 2010 | 1 | ACTIVITY: BROWN-SOLO-N68; LEAD: TOM BROWN; ASSIGNED TESTER: TOM BROWN | ACTIVITY: WHITE-SHARED-1; LEAD: JILL WHITE ACTIVITY: DOE-SHARE-1; LEAD: JOHN DOE | RESERVED: USS TEAM | ACTIVITY: WHITE-SOLO-1,3; LEAD: ANN WHITE; ASSIGNED TESTER: ANN WHITE |
| | 2 | SPECIAL REQUEST: GREEN PLEX1 & N68 TESTER: BOB GREEN | SPECIAL REQUEST: GREEN PLEX1 & N68 TESTER: BOB GREEN | RESERVED: USS TEAM | ACTIVITY: SMITH-SOLO-1,3; LEAD: SALLY SMITH |
| | 3 | | ACTIVITY: SMITH-JONES-SOLO-1; LEAD: JIM SMITH; ASSIGNED TESTER: JIM SMITH | RESERVED: USS TEAM | ACTIVITY: BAKER-SOLO-1,3; LEAD: SUE BAKER; ASSIGNED TESTER: SUE BAKER |

FIG. 7B

| | | | | |
|---|---|---|---|---|
| FRI JAN 8 2010 | 1 | | RESERVED: USS TEAM | ACTIVITY: DOE-SOLO-1,3; LEAD: JOHN DOE |
| | 2 | ACTIVITY: JOHNSON-SOLO-1,3; LEAD: JOE JOHNSON; ASSIGNED TESTER: JOE JOHNSON | RESERVED: USS TEAM | ACTIVITY: JONES-SOLO-1,3; LEAD: JANE JONES; ASSIGNED TESTER: JANE JONES |
| | 3 | | RESERVED: USS TEAM | ACTIVITY: WHITE-SOLO-1,3; LEAD: ANN WHITE; ASSIGNED TESTER: ANN WHITE |
| SAT JAN 9 2010 | 1 | | RESERVED: USS TEAM | ACTIVITY: DOE-SOLO-1,3; LEAD: JOHN DOE |

FIG. 7C

SCHEDULING HETEROGENEOUS PARTITIONED RESOURCES WITH SHARING CONSTRAINTS

BACKGROUND

The present invention relates generally to software testing in software development centers.

Software testing in large development centers is complex and expensive. Large test organizations, responsible for simultaneously testing numerous products, face difficulty scheduling testing tasks in a way that satisfies test configuration requirements, resource limitations imposed by system availability, and capacity of physical test machines. Inefficient scheduling of test runs can lead to underutilization of both human and physical machines, which can, in turn, lead to disruption of the software development cycle, premature termination of the test phase, and/or deferred delivery dates. Scheduling test activities by hand is tedious and more importantly, it is likely to result in low-quality schedules. Yet the problem of automating scheduling to optimize resource utilization has received little attention relative to other parts of the testing process.

A general background on scheduling models and methodologies can be found in the reference entitled "*Handbook of scheduling: Algorithms, Models, and Performance Analysis*", Edited by Joseph Y.-T. Leung. Chapman & Hall/CRC Computer and Information Science Series. Chapman & Hall/CRC, Boca Raton, Fla., 2004, the entire contents and disclosure of which is incorporated by reference as if fully set forth herein.

A closely related previously studied problem is known as timetabling such as described in a reference authored by S. Petrovic and E. Burke entitled "University Timetabling" founding above-incorporated In *Handbook of scheduling. Algorithms, models, and Performance Analysis*, edited by Joseph Y.-T. Leung. Chapman & Hall/CRC Computer and Information Science Series. Chapman & Hall/CRC, Boca Raton, Fla., 2004, chap. 45.

In a typical application, classrooms must be allocated to classes, satisfying (non)-concurrency constraints similar to "sliding window" [defined in section 0037] constraints. However, classrooms are allocated exclusively with each class requiring only one room. Sophisticated local search techniques have been applied to timetabling and similar problems including: simulated annealing, tabu search, and genetic algorithms, e.g., as described in a reference entitled "*Local Search in Combinatorial Optimization,*" edited by E. Aarts and J. Lenstra. Reprint of the 1997 original [Wiley, Chichester; MR1458630], Princeton University Press, Princeton, N.J., 2003.

It would be desirable to provide an automated system and method for solving a complex scheduling problem faced by software product test organizations.

It would be desirable to provide the ability for a software developer to schedule all user (tester) jobs feasibly while satisfying the developer's time preferences to the greatest extent possible.

SUMMARY

In one aspect there is provided an automated system and method for solving a complex scheduling problem faced by software product test organizations.

In one embodiment, the present invention provides the ability to schedule all the user jobs feasibly while satisfying the users' time preferences to the greatest extent possible.

Further the present invention achieves fairness: if all preferences cannot be met, it is attempted to evenly distribute violations of preferences across the users.

According to one aspect, there is provided a method for scheduling tests to run on one or more computing resources, the method comprising: receiving data specifying a configuration and availability of the one or more computing resources, one or more the computing resources $M_i$ being partitionable into sub-units; receiving data including users specified tasks, and expected durations of the specified tasks to run on the one or more the computing resources or sub-units thereof; assigning, based on the data and machines availability, users tasks to computing resources, computing resource sub-units, and time slots; and generating a first initial schedule based on the assignments, the first initial schedule including tasks that remain unassigned; applying to the first initial schedule a local improvements optimization that assigns user tasks to computing resources sub-units and time slots, the assigning accounting for user preferences for the resources and time slots; and, generating a final task schedule based on the applied local improvements.

In a further aspect, there is provided a system for scheduling tests to run on one or more computing resources, the system comprising: a memory device; and a processor connected to the memory device, wherein the processor performs step of: receiving data specifying a configuration and availability of the one or more computing resources, one or more the computing resources $M_i$ being partitionable into sub-units; receiving data including users specified tasks, and expected durations of the specified tasks to run on the one or more the computing resources or sub-units thereof; assigning, based on the data and machines availability, users tasks to computing resources, computing resource sub-units, and time slots; and generating a first initial schedule based on the assignments, the first initial schedule including tasks that remain unassigned; applying to the first initial schedule a local improvements optimization that assigns user tasks to computing resources sub-units and time slots, the assigning accounting for user preferences for the resources and time slots; and, generating a final task schedule based on the applied local improvements.

Further to these aspects, a user task includes an associated sharing constraint, the sharing constraint including: non-sharing wherein a computing resource can not execute other tasks concurrently; computing resource-sharing wherein a computing resource is configured to concurrently run tasks that occupy different sub-units within that computing resource; or computing resource sub-unit-sharing, wherein sub-unit-sharing tasks can be processed on the same computing resource sub-unit concurrently up to a pre-determined maximum number of concurrent tasks, the configuration information specifying a configuration defined in relation to a tasks' constraints.

Further to these aspects, a user task is further characterized as having an associated high priority level or regular priority level, the assigning comprising: assigning an order of the tasks based on the task's associated priority level; generating a first initial schedule to provide, for a time horizon, and for one or more sub time intervals thereof, what task is scheduled, for which user the task is scheduled for, and a duration of the assigned task to be performed, the generating including scheduling as many high priority level jobs first, and then to schedule as many regular priority level jobs as possible.

BRIEF DESCRIPTION OF THE DRAWINGS

The objects, features and advantages of the present invention will become apparent to one skilled in the art, in view of the following detailed description taken in combination with the attached drawings, in which:

FIG. 4 shows an example of an objective function comparison example implemented according to an embodiment;

FIG. 6 shows an example comparison of a schedule generated by Greedy algorithm and a result schedule generated as result of applying Local Search improvement algorithm;

FIG. 7 shows an example final schedule resulting from applying Local Search improvement algorithm according to the embodiments described; and, FIG. 8 illustrates an exemplary hardware configuration for implementing methods as depicted in the flow charts of FIGS. 2 and 3 in one embodiment.

DETAILED DESCRIPTION

In one aspect, there is provided a system that provides an automated solution to obtaining quality schedules. The system, such as may be implemented in an enterprise operating system test center, collects information from test-shop personnel about test machine features and availability, test jobs, and tester preferences and constraints. The system reformulates this testing information as a system of constraints. An optimizing scheduling engine computes efficient schedules.

Figure 1:
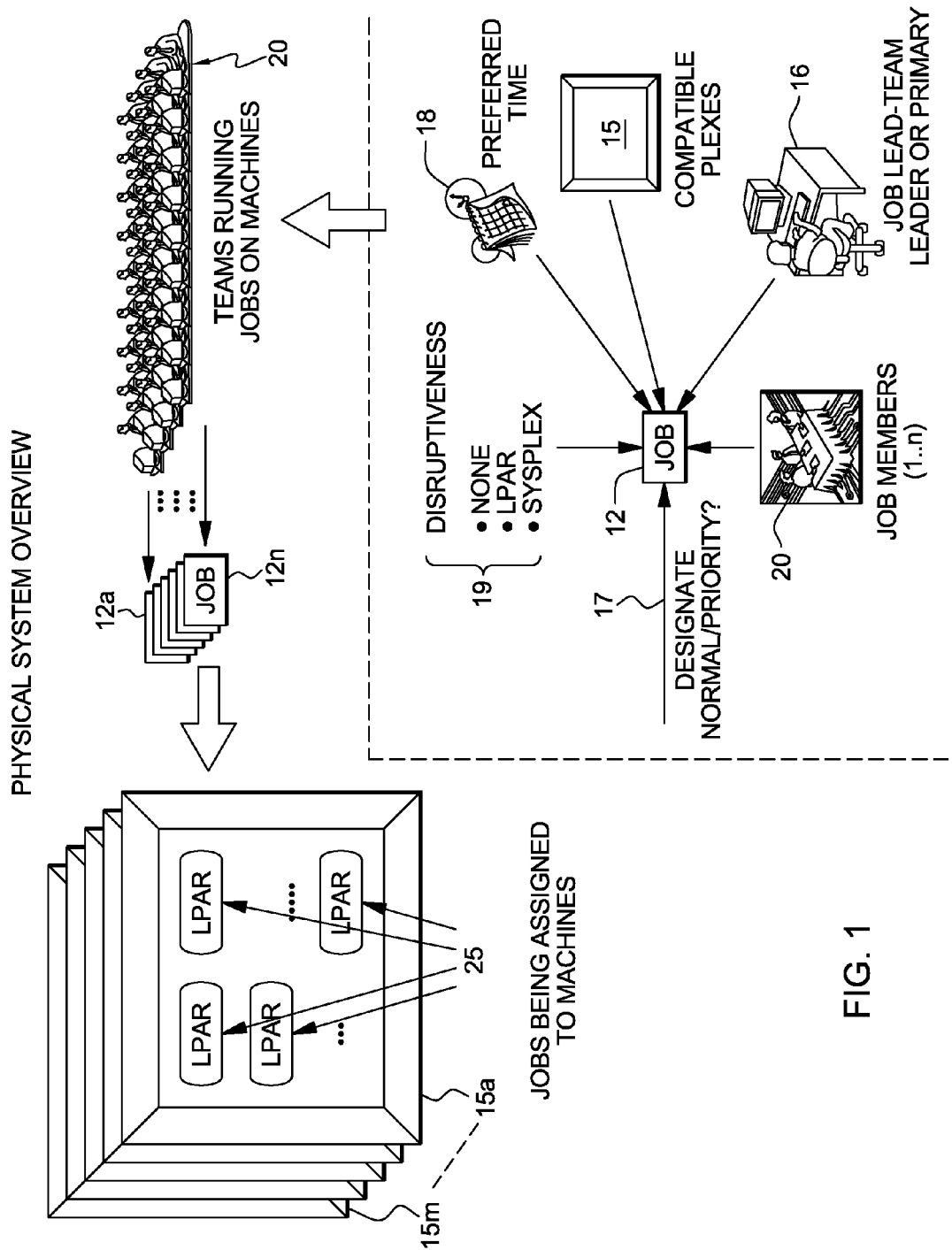
FIG. 1 depicts an overview of one embodiment of the testing problem 10 in terms of a set of testing jobs, a set of computational resources referred to as sysplexes on which jobs can be run, and a set of testers for running the testing jobs according to an embodiment of the invention.

As shown in FIG. 1, there is defined a testing problem 10 in terms of a set of testing jobs 12a, ... 12m, a set of computational resources referred to as sysplexes 15a, ... 15n on which jobs can be run, and a set of testers 20 who have specific responsibilities for running the testing jobs. Referring to FIG. 1, these elements have the following properties: A sysplex 15, or test system, is characterized by its configuration, and an availability schedule, e.g., time periods where there is downtime or maintenance scheduled. Configuration information could include number and types of processors, memory and network information, operating system version, installed software, and location. In one embodiment, a configuration may be defined in relation to jobs' constraints; administrators and/or testers specify, for each job, which sysplexes are compatible with it. A unique sysplex identifier with associated descriptive information serves this purpose. One visible feature is the number of LPARs ("logical partitions") 25 a sysplex hosts. These are the "schedulable units" whose usage is to be allocated. Sysplexes 15a, ... 15n may be shut down for maintenance, upgrades, etc. Thus, availability schedules can be specified to define when sysplexes are available for use in testing. A job 12, also known as a test session, is characterized by: its length, i.e., the number of contiguous test shifts required for the job to complete; a description of which sysplex(es) 15a, ... 15n are suitable for test operation, specified as a set of sysplex identifiers; the number of LPARs 25 it requires; and by a group of testers 20, charged with running the job, including a specified owner who has primary responsibility for the job.

For purposes of sharing sysplexes 15a, ... 15m simultaneously, jobs 12a, ... 12n are classified according to their "danger levels" 19 or measure of potential disruptiveness. The primary reason for not allowing a job to share a sysplex with others is that it may cause software failures. These failures may destroy or invalidate results or work-in-progress on co-scheduled jobs; thus, exclusive use of sysplexes is for the good of the excluded jobs/users. Some jobs pose no threat; these are termed "danger level" 0. Danger level 1 jobs may cause problems within an LPAR, but it is safe for another job to run concurrently on a different LPAR of the same sysplex. Danger level 2 jobs are capable of disrupting jobs even in other partitions, and so must be scheduled for exclusive use of an entire sysplex.

Each job 12 is further designated as being normal or being priority 17; in one embodiment, priority jobs are to be scheduled in preference over non-priority jobs.

Further, good utilization of resources often demands that testing be performed at inconvenient hours. Although as a matter of necessity testers' schedules are driven by sysplex availability and testing demands, there are limits on what can reasonably be expected of test employees. Limiting policies applying to all testers are imposed on consecutive shift assignments. In addition, testers can specify scheduling preferences 18 that relate to their lives outside the workplace. In one embodiment, preferences can be positive, i.e., preferred times for being assigned testing jobs; or negative, i.e., times that the tester would like to block off from testing assignments. Preferences are not binding and, while the scheduler attempts to assign testers to their preferred slots, this may not be guaranteed.

In one embodiment, requirements for a scheduler system and method may specify the following constraints and preferences:

Testing must be completed by a set date in order to meet product deadlines.

Some jobs may be more critical than others; for instance, a development organization may be waiting on the results.

Different sysplexes have different features (number of processors, memory capacity, network communication capabilities, etc.), so a workload may require a member of a certain subset of sysplexes.

Some test workloads require exclusive access to a sysplex; others may coexist in different LPARs of the same sysplex; and others may even share an LPAR with other workloads.

Sysplexes may be unavailable for scheduled maintenance activities.

As shown in FIG. 1, a job 12 may require (a specific set of) several people 20 to be present. Jobs requiring the same person or persons to be present must be separated in time; i.e, testers cannot work round-the-clock.

For example, of the preferences 18, testers have preferred times at which they would like to be able to do their testing (typically the same for most testers: e.g., daytime shifts Monday-Friday). Testers also have times at which they do not want to do testing (e.g., overnight and weekend shifts).

These requirements model the scheduling problem formally as now described: There is given a set of test jobs $J=\{J_1, \ldots, J_n\}$, a set of sysplexes $M=\{M_1, \ldots, M_m\}$ on which the jobs from the set J will be processed, and a set of testers $U=\{U_1, \ldots, U_k\}$. Each sysplex $M_i \in M$ includes $q_i$ identical subunits (LPARs). Each job $J_j \in J$ is designated 1) non-sharing; 2) sysplex-sharing, or 3) LPAR-sharing. These may also be referred to as "danger levels" 2, 1, and 0, respectively. LPAR-sharing jobs can be processed on the same LPAR(s) at the same time up to a fixed maximum (e.g., up to 3 jobs may use an LPAR). Sysplex-sharing jobs require exclusive use of LPARs, but other jobs can run on different LPARs in the same sysplex. Each non-sharing job requires the exclusive access to a sysplex. Each job $J_j \in J$ has an associated processing time $p_j$, a number $l_j$ of LPARs it requires, and a set of compatible sysplexes $\{M_{i1}, \ldots, M_{im}\}$ on which job $J_j$ can be processed. It is noted that $1_j \leq q_i$ for each $i \in \{i_1, \ldots, i_{mj}\}$; that is, each compatible sysplex must have enough LPARs to process job $J_j$. Some special "sysplex-wide" jobs require the use of all LPARs on a sysplex, regardless of their number. It is noted that there is no effective difference between danger levels 1 and 2 for these jobs; either option requires exclusive use of the whole sysplex. Danger level 0 "sysplex-wide" jobs can share LPARs with other danger level 0 jobs, e.g., up to three jobs in total per LPAR, in the embodiment described herein.

Further, every job $J_j$ has an associated priority 17, e.g., $PR_j \in \{0,1\}$, i.e., job $J_j$ is either regular ($PR_j=0$) or it has high priority ($PR_j=1$) and must be scheduled even if it decreases the quality of the schedule for regular jobs. There is a set of testers $S_j = \{Ut_1, \ldots, Ut_j\}$ associated with each job. In one embodiment, a primary constraint associated with testers is the herein referred "sliding window constraint": for every pair of jobs (tests) $J_j$ and $J_i$ such that $S_j \cap S_i \neq 0$, $J_i$ must be scheduled to start at least B time periods after the completion of $J_j$ or vice versa. In other words, each tester must have B periods off between tests. In one embodiment, schedule granularity is such that a unit of time (B) corresponds to an 8-hour shift, and B=2 (e.g., 16 hours). It is convenient to define an undirected graph G=(J, E) of incompatibility constraints. An edge set E is defined as follows: if $S_j \cap S_i \neq 0$, then $(J_j, J_i) \in E$. The graph G is one way to encode the sliding window constraint. If there is an edge $(J_j, J_i) \in E$, then the processing of jobs $J_j$ and $J_i$ must be separated by at least B time periods. Finally, each sysplex $M_i$, i=1, . . . , m has a set of non-availability time intervals associated with it. During these intervals the sysplex $M_i$ cannot be used for processing of any job. The graph G can be used in the feasibility tests of greedy and local search algorithms whenever it is needed to test that the job $J_i$ can be feasibly assigned to some plex $M_i$ at time T given fixed assignment of jobs before time T.

For every job there is a set of positive preferences, i.e., periods in which the associated team of testers responsible for it would like the job to be processed. For each job there is given a set of time windows $[t_i; t_i+p_j], [t_2; t_2+p_j], \ldots, [t_q; t_q+p_j]$ where q is the maximal number of allowed positive preferences. Analogously, for each job there is a set of negative preferences, i.e., times at which team would not like the job to be processed. For each job there is given a set of time windows $[t'_1; +p_j], [t'_2; t'_2+p_j], \ldots, [t'_w; t'_w+p_j]$ w is the maximal number of allowed negative preferences. All remaining time intervals are considered neutral.

In one embodiment, each job is assigned to be processed in a time interval preferred by the team of testers. However, as there may be conflicts of preferences for different tester teams, a goal of the scheduler is to assign jobs to sysplexes to maximize the number of positive preferences that are satisfied and minimize the number of negative preferences that are violated. Additionally, the schedule is to be envy-free or fair in some sense. It is not desired to provide a schedule in which some testers get all their positive preferences satisfied and some get all their negative preferences violated. There are many natural ways to incorporate such fairness constraints into the objective function.

In one embodiment, a local search technique is first used for finding the schedule. Thus, it is not necessary to define the value of a schedule explicitly. Given two schedules, it needs to be defined which schedule is "better" as will be described in greater detail herein. This is a very general mechanism that can be tailored as desired by different organizations with different needs. Some constraints are absolute; thus schedules are never considered that would violate them: They are 1) syspex availability; 2) job/sysplex compatibility and jobs' (numeric) LPAR requirements; 3) "sliding window" constraints as described previously; and, 4) sharing constraints as described previously.

Other constraints are softer: a low-priority job may be cancelled if necessary, and user preferences can be violated. One first goal is to schedule as many priority jobs as possible, and then to schedule as many regular jobs as possible. Next, the number of non-preferred time slot assignments are attempted to be minimized in a fair way. 1) First it is tried to bring all testers down to a bound on maximum number of bad assignments. Next 2) it is attempted to minimize the number of testers with this number of bad assignments, and finally 3) it is attempted to minimize the total number of bad assignments.

Similarly, the minimum number of good assignments is attempted to be raised over all testers, then it is attempted to minimize the number of testers at this minimum level, and finally it is attempted to maximize the total number of good assignments. However, if any tester receives all good time slots, that tester is not considered when determining the minimum number of good slots for any tester. A single tester with no jobs, for instance, would cause this value to be 0 and render it meaningless.

As further shown in FIG. 1, for each job, one tester is designated as the "main tester" 16 for the job. For purposes of determining schedule fairness as described herein below, jobs for which a tester is the main tester is counted when it is attempted to even out the numbers of good and bad assignments across the testers. There is defined two functions bad (u) and good(u) where bad(u) and good(u) denote the numbers of time slots assigned to jobs for which u is the main tester and u has negative and positive preferences, respectively. However, if all of a tester's assignments are preferred, then good(u)=∞ for that tester.

Thus, in one example embodiment, two schedules based on the following (objective) measures, are compared. In one embodiment, the two schedules are compared in this order. The first one for which one schedule is better than another determines the winner:

1. Number of priority jobs scheduled. (Larger is better.)
2. Number of non-priority jobs scheduled. (Larger is better.)
3. Maximum number maxbad of negative-preference slots assigned to any tester. (Smaller is better.)
4. Number of testers u such that bad(u)=maxbad. (Smaller is better.)
5. Total number of negative-preference assignments. (Smaller is better.)
6. Minimum number mingood of preferred slots assigned to any tester that does not get all jobs assigned to preferred slots. (Larger is better.)
7. Number of testers u such that good(u)=mingood. (Smaller is better.)
8. Total number of preferred assignments. (Larger is better.)

In one aspect, this scheduling problem includes many classical optimization problems that are intractable both from practical and theoretical viewpoints. In particular, one problem includes vertex coloring, open shop scheduling, unrelated parallel machines scheduling, paging with variable page sizes and others.

In one embodiment, a Local Search Framework is used to design an algorithm for finding an approximate solution to the problem. Thus, in a first step, it is attempted to find a feasible schedule of jobs within the planning horizon H, e.g., a day, week, month. One goal of the first step is to find a schedule that assigns as many jobs as possible without considering more sophisticated goals such as fairness. This is referred to herein as the "greedy" assignment.

Figure 2:
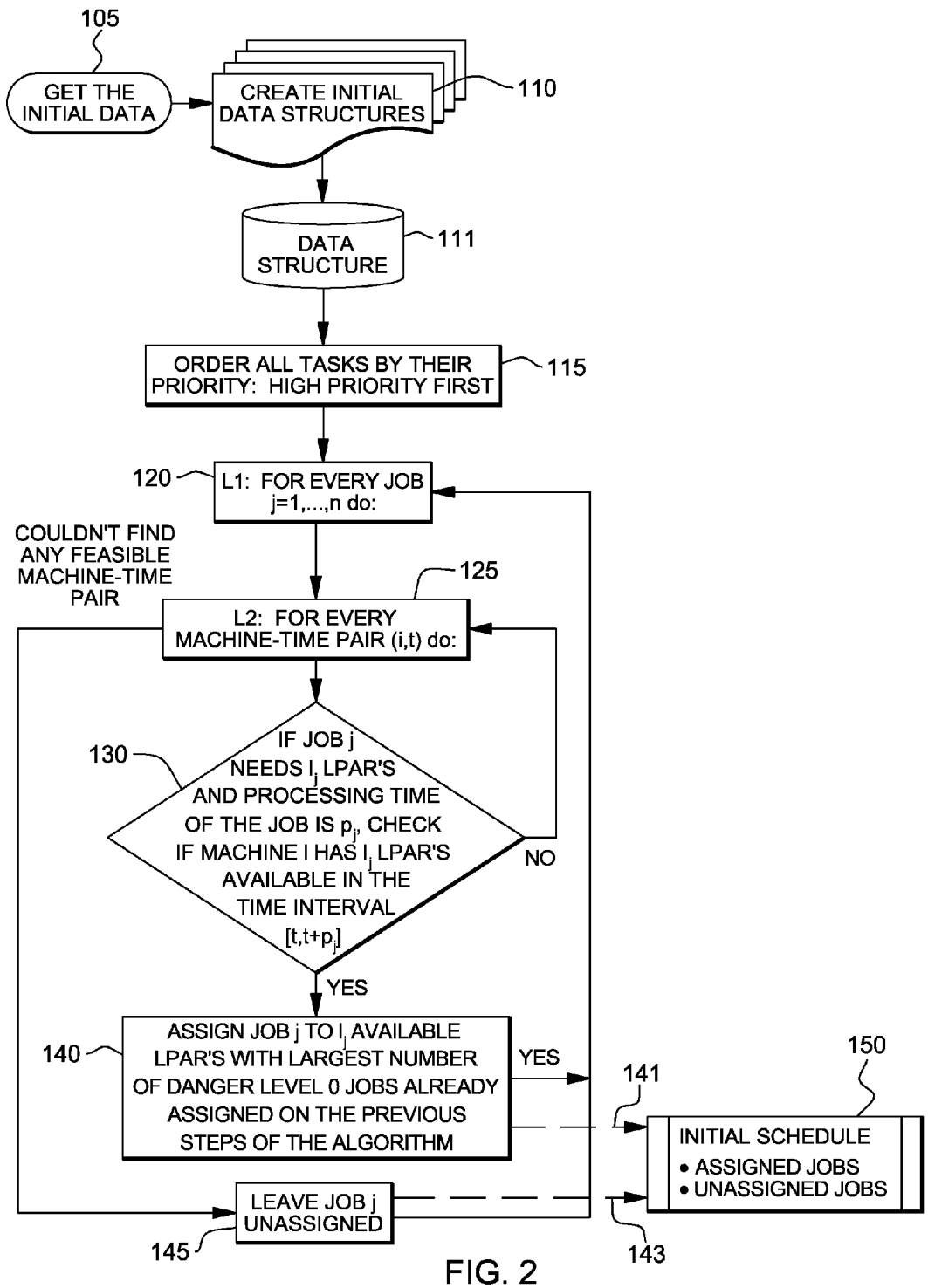
FIG. 2 depicts one example method 100 for performing a greedy assignment method, i.e., a first feasible solution for assigning jobs to sysplex/LPAR resources according to one embodiment.
Figure 3:
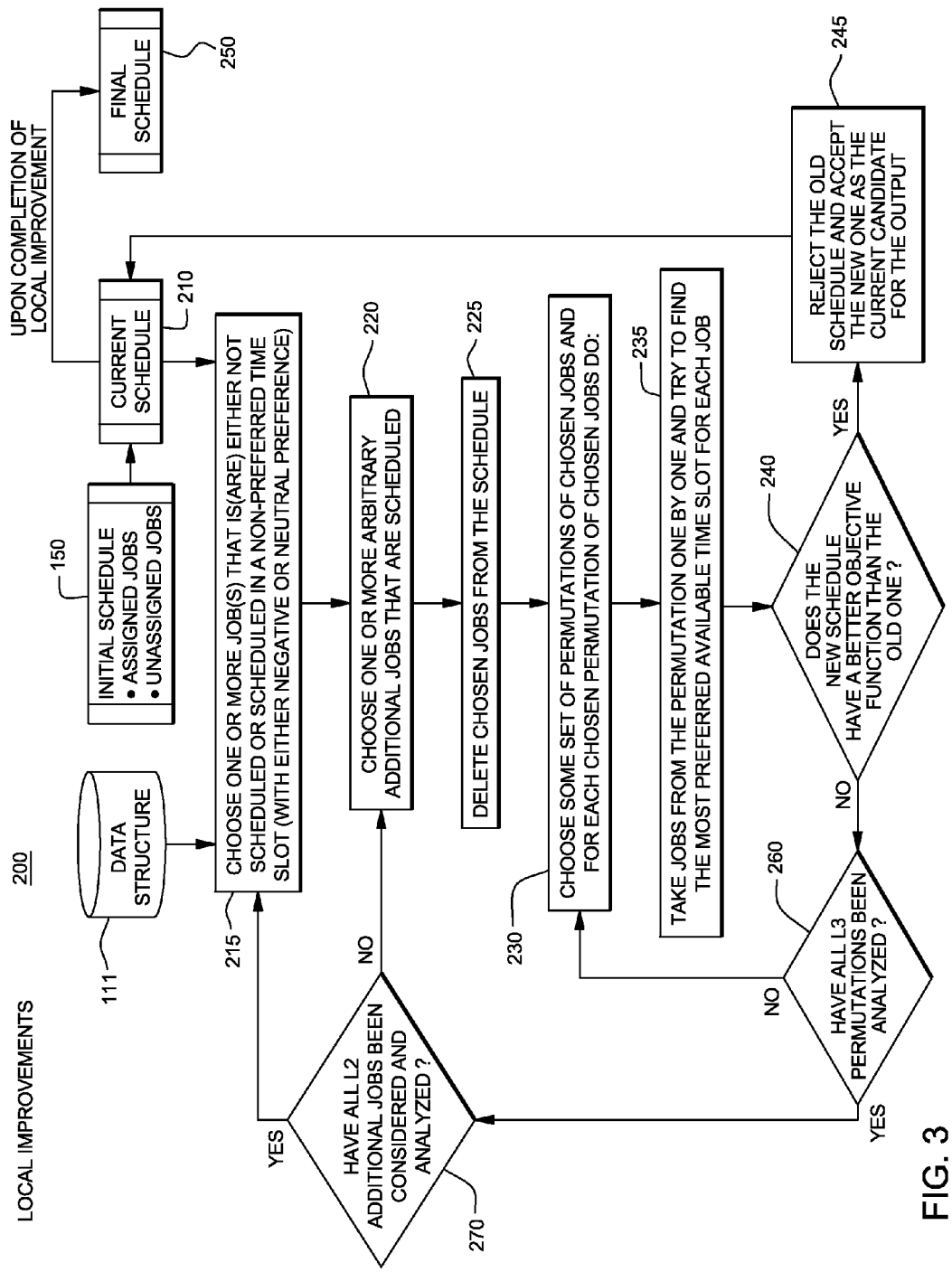
FIG. 3 depicts an exemplary method 200 for performing "local improvements" to the first feasible solution resulting from processing described with respect to FIG. 2.

FIG. 2 depicts an exemplary method 100 for performing the greedy assignment method, i.e., a first feasible solution for assigning jobs to sysplex/LPAR resources. As will be described, FIG. 3 depicts an exemplary method 200 for performing the afore-mentioned "local improvements" to the first feasible solution. As a result, a schedule is set up for a time horizon H, e.g., a week or month or any time period. For purposes of description, a time horizon H of a month planning is appropriate for users to plan ahead. For a time horizon or period H, each tester is assigned to one or more activities: preferred times (shift preferences) for testers ("positive" preference), alternate times that are not as preferred, e.g., user prefers shifts in the early morning, however, will settle for an afternoon shift when the preferred shift is not available ("neutral" preference); and, time period that a user does not want ("negative" preference).

A first step 105 of the first feasible solution includes gathering initial data about the jobs to run and the preferences of the tester, e.g., list of activities, plex/LPAR availability information, user/tester time period preferences, etc. This data is ultimately used to generate a schedule that will provide for each job an assignment of sysplex, LPARs, time period when the job is going to be processed.

At step 110, initial data structures are constructed to include the gathered input data, e.g., in the form of an array or tables, or combinations thereof, and at 111, FIG. 2, the data structures are stored in a memory storage device, e.g., a database, associated with a computer or processor. Then, at 115, given the input data structures, the list of jobs is assigned an order based on priority, for example, by traversing the list of jobs, one at a time, and assigning an order based on the job's associated priority (high priority and low priority). The job is inserted in the best possible way in the schedule, i.e., best preference that can be satisfied.

Because priority is absolute (i.e., it would be preferred to schedule one priority job at the expense of any number of regular jobs), a first pass is to schedule only priority jobs, and then making a second pass to schedule regular jobs. Within these passes, the jobs may be considered in an arbitrary order. For each job, a compatible sysplex with sufficient free resources at a time that is preferred for the job is sought. The first such assignment found is accepted. If no positively preferred time can be found, the first available neutral assignment is chosen; if no neutral time can be found, the first available assignment among negatively preferred time slots is taken, if any.

Then, at step 120, FIG. 2, a first loop L1 is entered in which each job $j(=1, \ldots, n)$ in the list is traversed and assigned to a period (slot) in the schedule. Within first loop L1, for each job j, a second loop L2 is entered at 125 in which further steps 130, 140 are implemented for processing every machine-time (e.g., sysplex-time) pair $(M_i; t)$.

A step in the method is thus: given a current partial initial schedule 150, one additional job 4 and a fixed machine-time pair $(M_i, t)$, choose $l_j$ LPARs on machine $M_i$ such that all LPAR sharing constraints are satisfied during the times $t, \ldots, t+p_j-1$. It is understood that availability depends on a danger level of job "j" and the current schedule for the previously considered jobs.

For example, for a job $J_j$ having danger level 2, then no job can be processed on machine $M_i$ during the times $t, \ldots, t+p_j-1$ in the current schedule. If this is the case $l_j \leq q_i$, LPARs may be arbitrarily chosen on machine A and process job $J_j$ on them during the time interval $[t; t+p_j]$. If $J_j$ is a "sysplex-wide" job, then job $J_j$ is assigned to all LPARs (e.g., a danger level 1 "sysplex-wide" job is equivalent to a danger level 2 job, in one embodiment).

If job $J_j$ has danger level 1, then $l_j$ are chosen that are not used in the time interval $[t, t+p_j]$ and assign $J_j$ to those LPARs. If there are more than $l_j$ available, $l_j$ of them are chosen arbitrarily.

Finally, if job $J_j$ has danger level 0, then an LPAR is available if it has two danger level 0 jobs already assigned to it in each time step in the interval $[t, t+p_j]$. If the number of available LPARs is larger than $l_j$ then LPARs $J_j$ on machine $M_i$ can be feasibly scheduled during the time interval $[t, t+p_j]$. The $l_j$ LPARs are chosen that have the maximum numbers of danger level 0 jobs already assigned to them in time step t as it is desirable to concentrate danger level 0 jobs on as few LPARs as possible and keep as many LPARs as possible empty for danger level 1 jobs.

It is noted that in a different application when most jobs are of danger level 0, a strategy may be applied that tries to spread danger level 0 jobs on as many LPARs as possible.

Thus, referring to FIG. 2, at 130, in the second loop L2, it is first determined whether job j needs $l_j$ LPAR's and processing time of the job is $p_j$, and then further determines if machine "$M_i$" has LPAR's available in the time interval $[t, t+p_j]$. It is understood that "availability" depends on a danger level of job j and the current schedule for the previously considered jobs. If it is determined that there is no machine "$M_i$" having $l_j$ LPAR's available for the time interval $[t, t+p_j]$, then the process proceeds back to step 125 where another machine-time pair $(M_i, t)$ is chosen, and step 130 determination is performed again.

In this greedy approach, if it is determined at 125 that there is no real feasible machine-time pair for the job j, the job j remains unassigned and the process proceeds to step 145 where the unassignment may be communicated via 143 to the initial schedule 150 which may record or list the job j as being left unassigned, and the process proceeds back to step 120 where loop L1 returns the next job (e.g., $job_{j+1}$) for processing.

Otherwise, if it is determined at step 130 that there is a machine "$M_i$" having $l_j$ LPAR's available in the time interval $[t, t+p_j]$, then the process proceeds to step 140 where the job j is assigned to $l_j$ available LPAR's with largest number of danger level 0 jobs already assigned on the previous steps of the algorithm. This assignment of job j is recorded or listed in the initial schedule 150 as indicated by communication 141, shown in FIG. 2, and the process proceeds back to step 120 where loop L1 returns the next job (e.g., $job_{j+1}$) for processing.

Thus, at step 140, whether job j is assigned or not, the process proceeds back to step 120 where loop L1 returns the next job ($job_{j+1}$) for processing at steps 130, 140 and 145 until all jobs j and machine-time pairs are evaluated. As a result the initial schedule is formed having the list of all assigned and unassigned jobs processed according to the greedy algorithm.

The "greedy" assignment described with respect to FIG. 2, does not account for the "popularity" of sysplexes, i.e., determine those in highest demand and carefully schedule them or "save" them by using less demanded sysplexes first. Similarly, it does not account for the popularity of time slots according to user preferences. Thus, in one embodiment, "sysplex-wide" jobs are assigned to sysplexes with few LPARs, as this would reduce their overall resource consumption. In one embodiment, priority jobs may be blindly scheduled first, even though there may be "easy" priority jobs (highly flexible in terms of times and sysplex compatibility) and "hard" regular jobs.

In one embodiment, instead of trying to characterize a workload (for instance, jobs may be "easy" or "hard" to schedule for different reasons, such as demand for highly constrained resources vs. highly constrained testers) and experiment to determine the relative importance of the various factors described above, a local improvement technique is used regardless of which of the factors are most important. In this embodiment, a subset of jobs is chosen, and possibilities for re-arranging the schedule by moving the subset of jobs is explored. If a better schedule is found according to the criteria discussed, the old schedule can be discarded and the new one adopted. This is repeated until no improvements are found, or until a pre-determined limit on the number of iterations is reached.

FIG. 3 depicts an exemplary method 200 for performing the aforementioned "local improvements" to the first feasible solution resulting from processing described with respect to FIG. 2. As shown in FIG. 3, there is provided a memory storage device 111 including the stored data structures, e.g., a database, and the initial schedule 150 including assigned and unassigned jobs. In the processing depicted in FIG. 3, the initial schedule is considered a "current" schedule 210. Thus, at 210 there is performed a first step of defining the current schedule resulting from the job assignment processing 100 depicted in FIG. 2. Then, at 215, the method chooses one or more job(s) that is(are) either not scheduled or scheduled in a non-preferred time slot (having either negative or neutral preferences), and, at 220, chooses one or more arbitrary additional jobs that are already scheduled. Then, at step 225, the chosen jobs are deleted from the current schedule. Then, at step 230, there is determined a set of permutations of the chosen jobs, and at 235, there is performed the step of taking jobs from the permutation one by one and attempting to find the best (most preferred) available time slot for each job to form a new schedule by enumerating over time-sysplex pairs and choosing the most preferred pair that is feasible with respect to the current schedule. Then, at step 240, a determination is made as to whether the new schedule has better objective function than the old one. Since there are multiple-objective function values, the value of each objective function is computed for the old and the new schedule. A lexicographical comparison is then performed between the two sets of objective function value in the order of priority till a value that makes one schedule value better than the other is encountered.

FIG. 4 depicts an example objective function comparison chart 300 that may be utilized by the process at 240, FIG. 3 for automatically determining whether the new schedule has a better objective function than the old one. That is, each of the resulting formed schedules have one or more associated objective values calculated that is used as a basis for comparison for determining whether a current schedule result is better than a prior schedule result. FIG. 4 illustrates a chart 300 including the basis data for objective function comparison. In chart 300, FIG. 4, the objective data calculated for a current schedule is set forth in columns, such as column 305 representing the actual objectives including, but not limited to the following: 1) Number of priority jobs scheduled; 2) Number of non-priority jobs scheduled; 3) Maximum number of negative-preference slots assigned to any tester; 4) Number of testers with maximal number of bad preferences; 5) Total number of negative-preference assignments; 6) Minimum number of preferred slots assigned to any tester that does not get all jobs assigned to preferred slots; 7) Number of testers with minimal number of preferred time slots; 8) Total number of preferred assignments. In chart 300, FIG. 4, these objectives are listed in priority order as depicted by the priority list at col. 302. Further, a direction is indicated at column 310, FIG. 4, for each of the enumerated priority objectives. These indicated directions provide the basis for comparing the objective values at that priority level that are computed for the schedules to be compared. For example, for the highest priority (1) associated with the objective "number of priority jobs scheduled", the direction column 310 indicates that the larger number is better. Thus, for example, at step 240, FIG. 3, for two schedules having objective functions being compared as a result of processing 200, FIG. 3, the schedule that results in the larger number of priority jobs scheduled (priority level 1) as compared to a prior schedule will be chosen as the current schedule. In the example shown in FIG. 3, for two example current schedules 314 (Case 1), 316 (Case 2) formulated according to methodology depicted in FIGS. 2, 3, having example associated objective values at the first priority level as shown in FIG. 4, it is determined that these values are equal. If the result of objective comparison at a priority level shows equal values for the two schedules, as in FIG. 4, the next priority level objective is compared. Thus, for example, at step 240, FIG. 3, for two schedules having an equal "number of priority jobs scheduled", the basis for comparison is at the next priority level (priority 2) and a determination is next made as to whether the new schedule results in the larger "number of non-priority jobs scheduled". As can be seen in the example chart 300, FIG. 4, for the two example case schedules 314, 316 depicted, the objective values at each of priority levels (1)-(4) are all equal chosen as the current schedule over the prior schedule. As objectives are compared according to the priority order, thus, in the comparison of the objective functions for the two case schedules 314, 316 it is at the fifth objective "total number of negative-preference assignments" at priority level 5) where the comparison results show the preference of Case 1 as it has a lower value (value=2) than the objective value for Case 2 (value=3) and the direction column and cell 320 indicates that the smaller number is preferred.

Returning to FIG. 3, at 240, if it is determined that the new schedule has a better objective function than the old one, the old schedule is rejected at 245 and the new one accepted as the current (candidate) schedule for the output schedule as indicated by the loop back to the current schedule 210 in FIG. 3. Otherwise, the existing current schedule is retained as new current schedule (e.g., Case 1 of FIG. 4 example would be retained). At that point, a new iteration of the local improvements process is performed by initiating the process beginning at step 215 by choosing one or more new jobs. Otherwise, if, at 240, it is determined that the new schedule does not have a better objective function as the old one, the process proceeds to step 260 where it is determined whether all permutations of the new jobs chosen at step 230 in the current iteration have been analyzed. If all permutations of the chosen jobs for scheduling have not been attempted, then the process proceeds back to step 230 where a new permutation of the chosen jobs is selected in order to find the most preferred available time slots for those jobs at 235. Thus, steps 240 and 245 may be repeated for this chosen job set. Otherwise, at 260, if it is determined that all permutations of the chosen jobs have been analyzed, then the process proceeds to step 270 where a determination is made as to whether all additional jobs been considered and analyzed. If it is determined at 270 that not all arbitrarily chosen additional jobs have been considered and analyzed, then the process returns to step 220 where one or more arbitrary additional jobs that have been scheduled may be chosen (and deleted from the current schedule) in an attempt further scheduling improvement according to the succeeding steps 225, 230, 235, 240 etc. Otherwise, at 270, if all arbitrarily chosen additional jobs have been considered and analyzed, then the process returns to step 215 where again the system chooses one or more job(s) that is (are) either not scheduled or scheduled in a non-preferred time slot (having either negative or neutral preferences) for attempting to find more preferred time slots according to the method of FIG. 3.

Once the local improvement iterations depicted in FIG. 3 have been completed and jobs optimally placed according to the processing therein, at step 210, the current schedule is accepted as the final output schedule 250.

Thus, to find an improvement in schedule quality, at least one job must be started that is either not scheduled, or scheduled in a non-preferred time slot. These at least one job(s) may include an arbitrary such job, and, for example, two other arbitrary jobs regardless of their current status, making a total of three (3) jobs in one example. Of the six possible permutations of these jobs, two example permutations (lexicographic by job ID and its reverse) are chosen. An attempt is made to re-insert the three jobs in the selected order, in each case choosing the first preferred assignment (if possible), etc.

Exhaustive iteration is applied over all combinations with one exception: namely, a heuristic is used to determine the final details of a scheduling assignment: the particular LPARs within a sysplex that a job will run on. Because it is expected most jobs to be sysplex-sharing (i.e., to require exclusive use of LPARs), LPAR-sharing jobs are better packed as tightly as possible rather than to spread them over many LPARs.

Figure 5A:
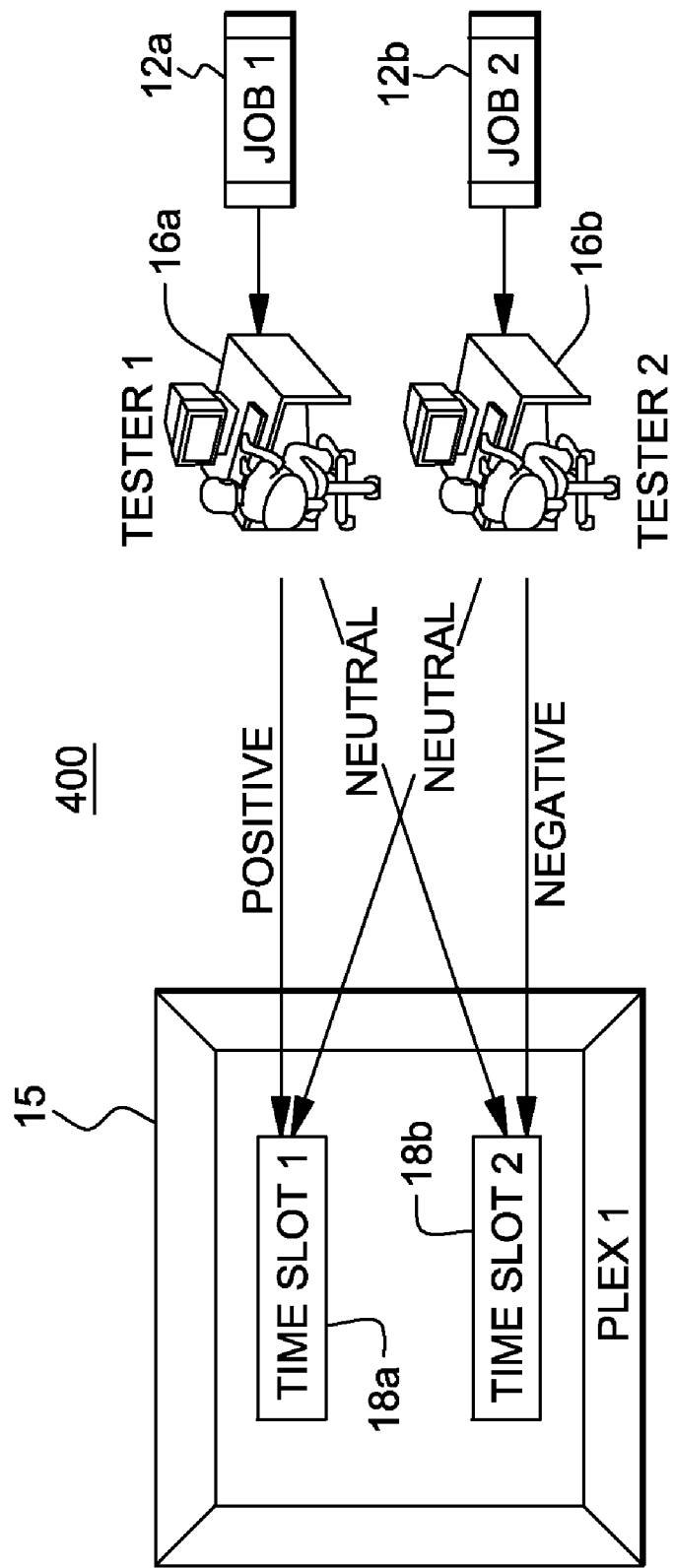
FIGS. 5A-5C is an example scenario depicting implementation of the local improvement algorithm of FIG. 4, with FIG. 5A depicting initial availability of machines and time slots, FIG. 5B depicting an initial schedule after application of the greedy algorithm, and FIG. 5C depicting a resulting schedule after application of the local improvements.
Figure 5B:
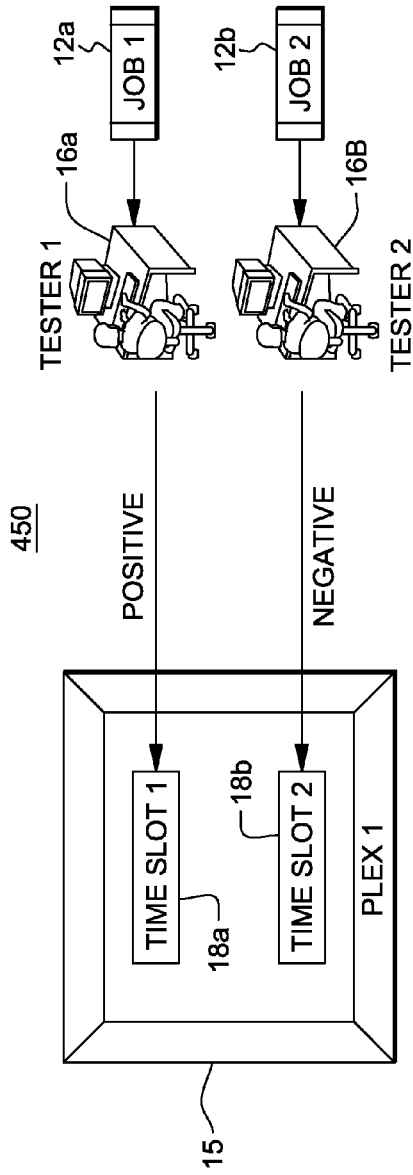
Figure 5C:
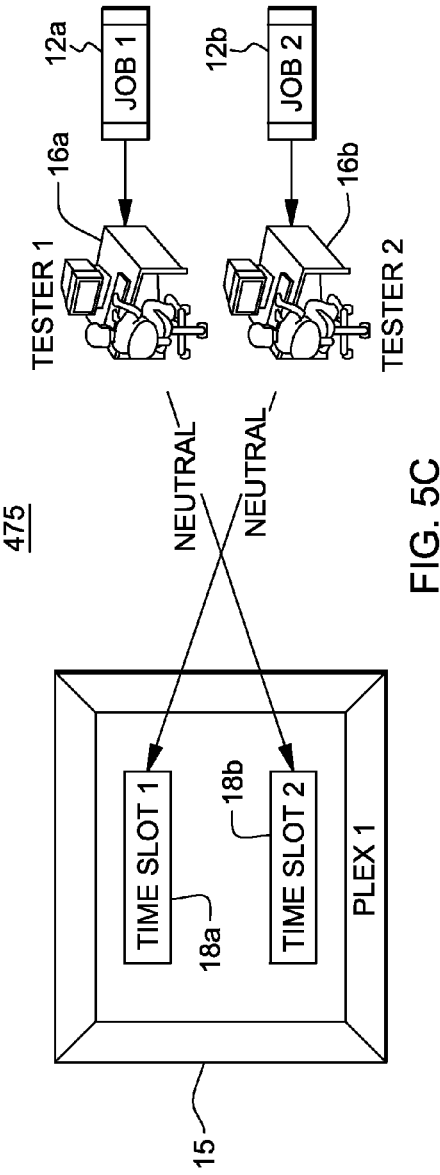

FIGS. 5A-5C show an example scenario 400 illustrating processing depicted in FIGS. 2 and 3. In the scenario 400, two testers 16a, 16b are depicted, with tester 16a to be scheduled for processing job 1 12a, and tester 16b to be scheduled for processing job 2 12b. As shown in FIG. 5, in the example scenario 400, tester 16a Indicates preferred times at which they would like to be able to do their testing and show two preferences, a positive value preference for testing job 12a on machine 15 at a time slot 1 18a and a neutral value preference for testing job 12b on machine 15 at a time slot 2 18b. Similarly, as shown in FIG. 5, in the example scenario 400, tester 16b indicates preferred times at which they would like to be able to do their testing and show two preferences, a neutral value preference for testing job 12b on machine 15 at a time slot 1 18a and a negative value preference for testing job 12b on machine 15 at a time slot 2 18b.

As a result of applying the greedy scheduling method depicted in FIG. 2 in example scenario 400, the resultant initial scheduling 450 is shown in FIG. 5B. As shown in FIG. 5B, a greedy scheduling for the example scenario 400 results in tester 16a assigned time slot 1 18a (tester 16a positive preference) and tester 16b assigned time slot 2 18b (tester 16b negative preference).

As a result of applying the local improvements method depicted in FIG. 3 in example scenario 400, the resultant final scheduling 475 is shown in FIG. 5C. As shown in FIG. 5C, a final schedule for the example scenario 400 results in tester 16a being assigned time slot 2 18b (tester 16a's neutral preference) and tester 16b assigned time slot 1 18a (tester 1 6b's neutral preference).

FIG. 6 depicts a chart 500 illustrating the comparison of the objectives calculated for the greedy (initial schedule) and local improvements (current schedule) for the example scenario 400 depicted in FIG. 5A. As shown in FIG. 6, chart 500 indicates the objective 505 listed according to priority order 502, and a direction indicated at column 510 providing the basis for resolving compared objective values at a priority level for the schedules 514 resulting from application of the greedy scheduling algorithm (shown in FIG. 5B), for example, and current schedules 516 resulting from application of the local improvements method (shown in FIG. 5C). As objectives are compared according to the priority order, in the comparison of the objective functions for the resultant greedy and locally improved schedules 514, 516 it is at the third objective "Maximum number of negative-preference slots assigned to any tester" at priority level 3) where the comparison results show the preference of the locally improved schedule 516 as it has a lower value (value=0) than the objective value for initial greedy schedule (value=1) as the direction column and cell 520 indicates that the smaller number is preferred.

FIG. 7 depicts an example final schedule 600 resulting from processing of FIGS. 2 and 3. As shown in FIG. 7, schedule 600 includes the schedule time horizon 602, e.g., one week including entries for each day thereof, with each day broken up into three (3) shifts 603 for example. For each week/day/shift entry in the schedule, the available sysplexs/machines 605 are provided with an indication of the scheduled assigned tester(s). Thus, for example in the first day of first week, for a first sysplex indicated as plex "N68", a first shift shows a tester being assigned to first compatible plex 1 610, and plex 2 614 being reserved for other users at that time shift, and another tester being assigned to compatible plex 3 616 at that time shift.

In sum, the present invention is configured to automatically schedule all the jobs feasibly while satisfying the users' time preferences to the greatest extent possible. A further goal is fairness: if one can not meet all preferences, it is attempted to evenly distribute violations of preferences across the users.

Advantageously, the system method and computer program product provides users that need time on test machines with specific features and configurations to perform the test tasks assigned to them. For example, there is a limited number of machines with any given configuration, and this makes the machines resources scarce. Machines are partitioned into (identical) subunits; each task is allocated a given (per-task) amount of time on a given (per-task) number of subunits. Depending on tasks' characteristics, some may be able to share (at the same time) a machine up to a specified maximum number of concurrent tasks. Some tasks can share subunits (subject to the maximum constraint), some can share a machine but must occupy different subunits within a machine, and some can not share a machine at all. Work must be completed by a given deadline. Users have preferred and undesired times, and will have time off between their tasks.

In one embodiment, the present invention may be employed for effectively scheduling tests for servers, mini or mainframe computing devices, and other multi-user computing systems. For example, the invention may be employed for z/OS operating systems development where z/OS is the operating system for International Business Machine's eServer® zSeries® mainframe computer line. The relevant configuration of z/OS relevant is that it must meet stringent reliability requirements and that it is released regularly, and thus completing test cycles on time is important. More thorough descriptions of the z/OS can be found at www.ibm.com/servers/s390/os390/, wholly incorporated by reference herein.

Figure 8:
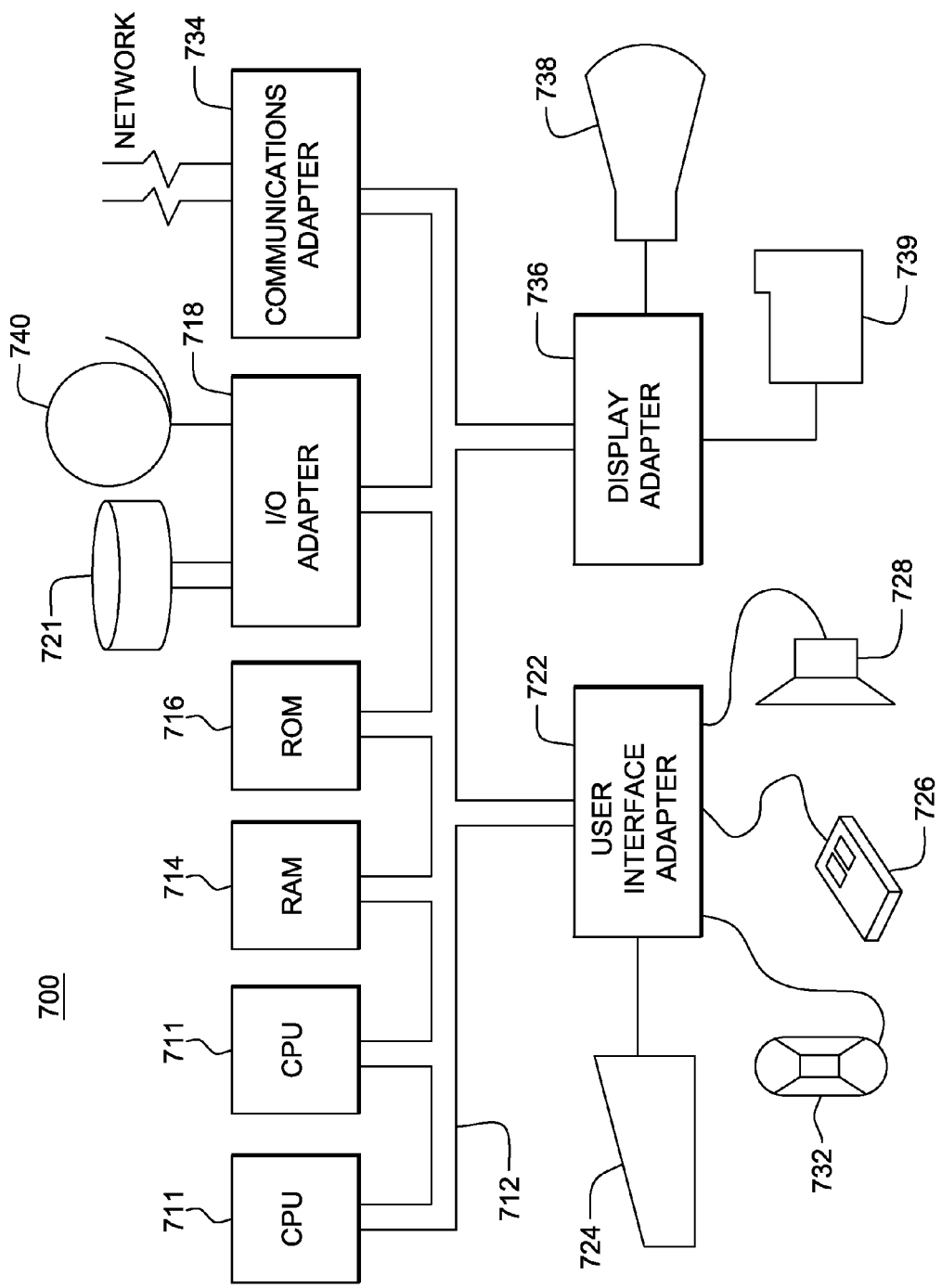

FIG. 8 illustrates an exemplary hardware configuration of a computing system 700 running and/or implementing the method steps in FIGS. 2 and 3. The hardware configuration preferably has at least one processor or central processing unit (CPU) 711. The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting the system 700 to a data processing network, the Internet, an Intranet, a local area network (LAN), etc., and a display adapter 736 for connecting the bus 712 to a display device 738 and/or printer 739 (e.g., a digital printer of the like).

In one example application performed on devices running z/OS, test schedules are determined on a weekly basis, e.g., with time slots being 8-hour shifts. Thus, an example time horizon is 21 time slots. In simple test cases obtained from testers, there were 6 sysplexes and 90 testers typically with a total of 30 jobs. The scheduler found ideal schedules in these cases: all testers received preferred slots for all their jobs.

Challenging test cases were generated randomly. Assuming the same 21-shift work week as before, the number of sysplexes is increased to 10. Down times were randomly chosen for sysplexes during overnight and weekend shifts. For each of these 11 time units, each sysplex was designated unavailable with probability 0.25. Thus the expected number of available (sysplex; time) slots is 10·21−10·11·0.25=182.5. Assigning 1 to 4 randomly chosen testers to each job, with probability 0.8, 0.1, 0.05, and 0.05 respectively; i.e., with probability 0.8 a job has 1 tester, etc. Each job is disruptive with probability 0.9. Each job has length equal to 1 shift with probability 0.85, 2 with probability 0.1, and 3 with probability 0.05. Each job/sysplex pair is compatible with probability 0.8. Finally, for each job, each of the 5 weekday shifts is designated "good" (i.e., a positive preference) with probability 0.9, and each of the 11 overnight and weekend shifts is designated "bad" with probability 0.95. The scheduler's performance is described at two points as the number of jobs increases. Around 75 jobs, all jobs are scheduled but it becomes difficult to avoid some bad assignments. Thus the interesting measures of performance, according to one objective criteria, are the numbers of good and bad assignments and the degree to which these are spread among users for fairness. Table 1 gives these values on three randomly generated instances. The last column, labeled "U.B. good," represents an upper bound on the number of preferred assignments based on the number of weekday slots (50) and the number of non-disruptive jobs; i.e., if there are n non-disruptive jobs, at most 50+n−1 jobs can be placed in preferred slots. (There may be tighter bounds in a given instance due to other constraints.) From the result provided in TABLE 1 below showing the scheduling performance on random instances of 75 jobs each, the scheduler performs well regarding fairness, i.e., even distribution of preferred and non-preferred assignments, with one exception. In an example case of an unlucky user receiving 2 non-preferred assignments, this user's 5 jobs with a total of 8 time units cannot be scheduled with fewer bad assignments, given the sliding window constraints. It is also seen that the scheduler is always within 2 of the maximum possible number of preferred assignments.

TABLE 1

| max bad | #max bad | total bad |
|---|---|---|
| 1 | 3 | 3 |
| 2 | 1 | 3 |
| 0 | 75 | 0 |

| min good | #min good | total good | U.B. good |
|---|---|---|---|
| 0 | 3 | 53 | 54 |
| 0 | 1 | 50 | 52 |
| 1 | 1 | 54 | 56 |

In a further example, with 140 jobs or fewer, the algorithm schedules nearly all jobs, and, with 160 or more jobs, nearly all available sysplex/time slots were filled, so there was no reason in adding more jobs. Thus, the focus is on instances with 150 jobs (and 75 testers).

Since the first scheduling criterion is the number of priority jobs scheduled, there is next examined the behavior of the algorithm as the expected number of priority jobs is increased from 0 to 80%. (Note 100% is in effect no different from 0.) The results of three test cases is presented in Table 2 below:

TABLE 2

| # priority jobs | 0% | 20% | 40% | 60% | 80% |
|---|---|---|---|---|---|
| jobs scheduled | 146 | 147 | 147 | 145 | 146 |
| pr. jobs scheduled | n/a | 45/45 | 73/73 | 94/95 | 114/115 |
| utilization | 92.7% | 91.0% | 91.5% | 91.5% | 92.7% |
| all jobs scheduled | 143 | 145 | 144 | 143 | 144 |
| pr. jobs scheduled | n/a | 35/35 | 53/53 | 82/82 | 117/120 |
| utilization | 90.7% | 95.1% | 96.7% | 96.7% | 92.9% |
| all jobs scheduled | 149 | 148 | 147 | 147 | 145 |
| pr. jobs scheduled | n/a | 34/34 | 59/59 | 92/92 | 117/119 |
| utilization | 94.3% | 93.1% | 93.1% | 92.5% | 91.4% |

From the experimental data about the primary and secondary scheduling criteria the following observations and conclusions from the experimental data about the primary and secondary scheduling criteria are provided: Recalling that these are the numbers of priority jobs scheduled and all jobs scheduled, respectively:

In all cases with 60% or fewer priority jobs, all priority jobs are scheduled and thus the schedule is optimal with respect to the first criterion. Sysplex utilization is in general very high, and never less than 90%. Simultaneously, the number of priority jobs scheduled is always more than 97%, and the number of all jobs scheduled is always more than 95%.

When all priority jobs are scheduled, and, as results of the Table 2 are traversed from left to right across the table, it is expected the total number of jobs scheduled to be non-increasing. This is because a solution to an instance on the right is valid for one to its left and is optimal with respect to priority jobs in this example "less-constrained" instance.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Having thus described our invention, what we claim as new, and desire to secure by Letters Patent is:

1. A method for scheduling jobs to run on one or more computing resources, said method comprising:
receiving data specifying a configuration and availability of said one or more computing resources, one or more said computing resources $M_i$ being partitionable into sub-units;
receiving data including users specified tasks, and expected durations of said specified tasks to run on said one or more said computing resources or sub-units thereof, a user task characterized as having an associated high priority level or regular priority level, and for each task, receiving data representing a set of positive preferences indicating user preferred time slots for processing said task, and data representing a set of negative user preferences indicating time slots for not processing said task;

assigning, based on said data and machines availability, users tasks to computing resources, computing resource sub-units, and time slots; and generating a first initial schedule based on said assignments to provide, for a time horizon, and for one or more sub time intervals thereof, what task is scheduled, for which user the task is scheduled for, and a duration of the assigned task to be performed, said generating including scheduling as many high priority level jobs first, and then to schedule as many regular priority level jobs as possible, said first initial schedule including tasks that remain unassigned;

applying to said first initial schedule a local improvements optimization that assigns user tasks to computing resources sub-units and time slots, said assigning accounting for user preferences for said resources and time slots such that a total number of time slot assignments for users indicating said positive preference time slots is maximized, and a total number of time slot assignments for users indicating said negative preference time slots is minimized; and generating a final task schedule based on said applied local improvements.

2. The method as claimed in claim 1 wherein a user task includes an associated sharing constraint, said sharing constraint including:

non-sharing wherein a computing resource can not execute other tasks concurrently;

computing resource-sharing wherein a computing resource is configured to concurrently run tasks that occupy different sub-units within that computing resource; or computing resource sub-unit-sharing, wherein sub-unit-sharing tasks can be processed on the same computing resource sub-unit concurrently up to a pre-determined maximum number of concurrent tasks, said configuration information specifying a configuration defined in relation to a task's constraints.

3. The method as claimed in claim 2, wherein said generating said first initial schedule comprises:

a) entering a first loop L1 in which a task in the assigned order is traversed; and, b) within first loop L1, for each task, entering a second loop L2 that iterates through remaining computing resource-time slot pairs ($M_i$; t) for determining whether to schedule said task in a remaining computing resource-time slot pair ($M_i$; t), wherein, for a task to be scheduled, given a partial first initial schedule and a computing resource-time pair ($M_i$, t), choosing one or more computing resource sub-units of said computing resource $M_i$ such that all sharing constraints for all tasks in said chosen computing resource sub-units are satisfied during the times t, . . . , t+$p_j$−1, where $p_j$ is a processing time for said task to be scheduled; and, c) assigning said task to one or more available computing resource sub-units of said computing resource $M_i$ with a largest number of sub-unit-sharing tasks that are already assigned on prior iterations; and, d) repeating steps a) through b) to generate said first initial schedule.

4. The method as claimed in claim 3, wherein a user task that can not be scheduled in a computing resource-time slot pair ($M_i$; t) is further included in said schedule as an unassigned task.

5. The method as claimed in claim 2, wherein said minimizing a total number of time slot assignments for users indicating said negative preference time slots comprises:

bringing all users to a bound on maximum number of said negative preference time slots; minimizing the number of users with this number of said negative preference time slots, and said maximizing the total number of time slot assignments for users indicating said positive preference time slots comprises: raising a minimum number of said positive preference time slots over all users, and, minimizing a number of users at this minimum level.

6. The method as claimed in claim 2, wherein said applying said local improvements optimization comprises:

a) selecting, from said first initial schedule, one or more task(s) that is(are) either not scheduled or scheduled in a non-preferred time slot associated with a negative or neutral task preference;

b) selecting one or more arbitrary additional tasks that are scheduled;

c) removing said selected tasks from the first initial schedule;

d) choosing a set of permutations of said selected tasks, and, for each permutation set of selected tasks:

generating a current task schedule based on said tasks of said chosen permutations set; and, comparing an objective measure of said generated current task schedule with a prior objective measure determined for a generated current task schedule associated with an immediate prior permutation of said selected tasks set; and, e) assigning said current task schedule as said final task schedule if said objective measure of said generated current task schedule is greater than said prior objective measure determined for a generated current task schedule associated with said immediate prior chosen task set permutation.

7. The method as claimed in claim 6, wherein said step d) further comprises:

identifying, for each task of said chosen permutations set, a most preferred available time slot, and temporarily assigning said task to said preferred available time slot to generate a current task schedule; and, computing said objective measure of said generated current task schedule.

8. The method as claimed in claim 6, wherein if said objective measure of said generated current task schedule is not greater than said prior objective measure determined for a generated current task schedule associated with an immediate prior chosen task set permutation, then choosing another permutation of said selected tasks, and repeating said steps d) and e) for said another permutation.

9. The method as claimed in claim 8, further comprising:

determining whether all permutations of said selected tasks have been processed; and, if all permutations of said selected tasks have been processed:

determining whether other one or more arbitrary additional tasks that are scheduled can be considered for selection; and, if one or more arbitrary additional tasks that are scheduled can be considered for selection, one of:

repeating steps b) though e).

10. The method as claimed in claim 9, wherein if one or more arbitrary additional tasks that are scheduled can not be considered for selection, then:

selecting, from said first initial schedule, other one or more task(s) that is(are) either not scheduled or scheduled in a non-preferred time slot; and,
repeating steps b) though e).

11. The method as claimed in claim 6, wherein said objective measures are compared according to a priority order.

12. A system for scheduling jobs to run on one or more computing resources, said system comprising:
a memory device; and
a processor connected to the memory device, wherein the processor performs step of:
receiving data specifying a configuration and availability of said one or more computing resources, one or more said computing resources $M_i$ being partitionable into sub-units;
receiving data including users specified tasks, and expected durations of said specified tasks to run on said one or more said computing resources or sub-units thereof, a user task characterized as having an associated high priority level or regular priority level, and for each task, receiving data representing a set of positive preferences indicating user preferred time slots for processing said task, and data representing a set of negative user preferences indicating time slots for not processing said task;
assigning, based on said data and machines availability, users tasks to computing resources, computing resource sub-units, and time slots; and
generating a first initial schedule based on said assignments to provide, for a time horizon, and for one or more sub time intervals thereof, what task is scheduled, for which user the task is scheduled for, and a duration of the assigned task to be performed, said generating including scheduling as many high priority levels first, and then to schedule as many regular priority level jobs as possible, said first initial schedule including tasks that remain unassigned;
applying to said first initial schedule a local improvements optimization that assigns user tasks to computing resources sub-units and time slots, said assigning accounting for user preferences for said resources and time slots such that a total number of time slot assignments for users indicating said positive preference time slots is maximized, and a total number of time slot assignments for users indicating said negative preference time slots is minimized; and
generating a final task schedule based on said applied local improvements.

13. The system as claimed in claim 12, wherein a user task includes an associated sharing constraint, said sharing constraint including:
non-sharing wherein a computing resource can not execute other tasks concurrently;
computing resource-sharing wherein a computing resource is configured to concurrently run tasks that occupy different sub-units within that computing resource; or
computing resource sub-unit-sharing, wherein sub-unit-sharing tasks can be processed on the same computing resource sub-unit concurrently up to a pre-determined maximum number of concurrent tasks, said configuration information specifying a configuration defined in relation to a task's constraints.

14. The system as claimed in claim 13, wherein said generating said first initial schedule comprises:
entering a first loop L1 in which a task in the assigned order is traversed; and,
within first loop L1, for each task, entering a second loop L2 that iterates through remaining computing resource-time slot pairs ($M_i$; t) for determining whether to schedule said task in a remaining computing resource-time slot pair ($M_i$; t), wherein, for a task to be scheduled, given a partial first initial schedule and a computing resource-time pair ($M_i$, t), choosing one or more computing resource sub-units of said computing resource $M_i$ such that all sharing constraints for all tasks in said chosen computing resource sub-units are satisfied during the times t, . . . , t+$p_j$−1, where $p_j$ is a processing time for said task to be scheduled; and,
assigning said task to one or more available computing resource sub-units of said computing resource $M_i$ with a largest number of sub-unit-sharing tasks that are already assigned on prior iterations; and,
repeating entering said first L1 and second L2 loops to generate said first initial schedule.

15. The system as claimed in claim 14, wherein a user task that can not be scheduled in a computing resource-time slot pair ($M_i$; t) is further included in said schedule as an unassigned task.

16. The system as claimed in claim 13, wherein said:
minimizing a total number of time slot assignments for users indicating said negative preference time slots comprises:
bringing all testers users to a bound on maximum number of said negative preference time slots; and minimizing the number of users with this number of said negative preference time slots, and
said maximizing the total number of time slot assignments for users indicating said positive preference time slots comprises: raising a minimum number of said positive preference time slots over all users, and, minimizing a number of users at this minimum level.

17. The system as claimed in claim 13, wherein said applying said local improvements optimization comprises:
selecting, from said first initial schedule, one or more task(s) that is(are) either not scheduled or scheduled in a non-preferred time slot associated with a negative or neutral task preference;
selecting one or more arbitrary additional tasks that are scheduled;
removing said selected tasks from the first initial schedule;
choosing a set of permutations of said selected tasks, and, for each permutation set of selected tasks:
generating a current task schedule based on said tasks of said chosen permutations set; and,
comparing an objective measure of said generated current task schedule with a prior objective measure determined for a generated current task schedule associated with an immediate prior permutation of said selected tasks set; and,
assigning said current task schedule as said final task schedule if said objective measure of said generated current task schedule is greater than said prior objective measure determined for a generated current task schedule associated with said immediate prior chosen task set permutation.

18. The system as claimed in claim 17, wherein for each permutation set of selected tasks:
identifying, for each task of said chosen permutations set, a most preferred available time slot, and temporarily assigning said task to said preferred available time slot to generate a current task schedule; and,
computing said objective measure of said generated current task schedule, wherein if said objective measure of said generated current task schedule is not greater than said prior objective measure determined for a generated current task schedule associated with an immediate prior chosen task set permutation, then choosing another permutation of said selected tasks, and repeating said steps of choosing a set of permutations and said assigning.

19. A computer program product for scheduling tests to run on one or more computing resources, the computer program product comprising:
   a compute-readable storage medium having computer readable program code embodied therewith, the computer-readable program code comprising:
   computer readable program code configured to:
   receive data specifying a configuration and availability of said one or more computing resources, one or more said computing resources $M_i$ being partitionable into sub-units;
   receive data including users specified tasks, and expected durations of said specified tasks to run on said one or more said computing resources or sub-units thereof, a user task characterized as having an associated high priority level or regular priority level, and for each task, receive data representing a set of positive preferences indicating user preferred time slots for processing said task, and data representing a set of negative user preferences indicating time slots for not processing said task:
   assign, based on said data and machines availability, users tasks to computing resources, computing resource sub-units, and time slots; and
   generate a first initial schedule based on said assignments to provide, for a time horizon, and for one or more sub time intervals thereof, what task is scheduled, for which user the task is scheduled for, and a duration of the assigned task to be performed, said generating including scheduling as many high priority level jobs first, and then to schedule as many regular priority, level jobs as possible, said first initial schedule including tasks that remain unassigned;
   apply to said first initial schedule a local improvements optimization that assigns user tasks to computing resources sub-units and time slots, said assigning accounting for user preferences for said resources and time slots such that a total number of time slot assignments for users indicating said positive preference time slots is maximized, and a total number of time slot assignments for users indicating said negative preference time slots is minimized; and
   generate a final task schedule based on said applied local improvements.

20. The computer program product as claimed in claim 19, wherein a user task includes an associated sharing constraint, said sharing constraint including:
   non-sharing wherein a computing resource can not execute other tasks concurrently;
   computing resource-sharing wherein a computing resource is configured to concurrently run tasks that occupy different sub-units within that computing resource; or
   computing resource sub-unit-sharing, wherein sub-unit-sharing tasks can be processed on the same computing resource sub-unit concurrently up to a pre-determined maximum number of concurrent tasks, said configuration information specifying a configuration defined in relation to a task's constraints.

21. The computer program product as claimed in claim 20, wherein said generating said first initial schedule comprises:
   entering a first loop L1 in which a task in the assigned order is traversed; and,
   within first loop L1, for each task, entering a second loop L2 that iterates through remaining computing resource-time slot pairs ($M_i$; t) for determining whether to schedule said task in a remaining computing resource-time slot pair ($M_i$; t), wherein, for a task to be scheduled, given a partial first initial schedule and a computing resource-time pair ($M_i$, t), choosing one or more computing resource sub-units of said computing resource $M_i$ such that all sharing constraints for all tasks in said chosen computing resource sub-units are satisfied during the times t, . . . , t+$p_j$−1, where $p_j$ is a processing time for said task to be scheduled; and,
   assigning said task to one or more available computing resource sub-units of said computing resource $M_i$ with a largest number of sub-unit-sharing tasks that are already assigned on prior iterations; and,
   repeating entering said first L1 and second L2 loops to generate said first initial schedule.

22. The computer program product as claimed in claim 20, wherein said applying said local improvements optimization comprises:
   selecting, from said first initial schedule, one or more task(s) that is(are) either not scheduled or scheduled in a non-preferred time slot associated with a negative or neutral task preference;
   selecting one or more arbitrary additional tasks that are scheduled;
   removing said selected tasks from the first initial schedule;
   choosing a set of permutations of said selected tasks, and, for each permutation set of selected tasks:
      generating a current task schedule based on said tasks of said chosen permutations set; and,
      comparing an objective measure of said generated current task schedule with a prior objective measure determined for a generated current task schedule associated with an immediate prior permutation of said selected tasks set; and,
   assigning said current task schedule as said final task schedule if said objective measure of said generated current task schedule is greater than said prior objective measure determined for a generated current task schedule associated with said immediate prior chosen task set permutation.

* * * * *